US010309593B2

United States Patent
Ji et al.

(10) Patent No.: US 10,309,593 B2
(45) Date of Patent: Jun. 4, 2019

(54) LAMP HOLDER FOR DESK LAMP AND DESK LAMP

(71) Applicant: BOE Technology Group Co., Ltd., Beijing (CN)

(72) Inventors: Chunyan Ji, Beijing (CN); Yanbing Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 289 days.

(21) Appl. No.: 14/767,520

(22) PCT Filed: Oct. 11, 2014

(86) PCT No.: PCT/CN2014/088390
§ 371 (c)(1),
(2) Date: Aug. 12, 2015

(87) PCT Pub. No.: WO2016/004689
PCT Pub. Date: Jan. 14, 2016

(65) Prior Publication Data
US 2016/0010815 A1    Jan. 14, 2016

(30) Foreign Application Priority Data

Jul. 11, 2014 (CN) .......................... 2014 1 0332023

(51) Int. Cl.
*F21S 6/00* (2006.01)
*F21V 8/00* (2006.01)

(52) U.S. Cl.
CPC ............ *F21S 6/003* (2013.01); *G02B 6/0043* (2013.01); *G02B 6/0063* (2013.01);
(Continued)

(58) Field of Classification Search
CPC .. G02B 6/0043; G02B 6/0063; G02B 6/0036; G02B 6/0058; G02B 6/0068; F21S 6/003; G02F 1/1334; G02F 1/133615
See application file for complete search history.

(56) References Cited

U.S. PATENT DOCUMENTS 7,248,764 B2 * 7/2007 Park ..................... G02B 6/0036
264/1.1
7,794,111 B2 * 9/2010 Huang .................... F21S 6/003
362/231

(Continued)

FOREIGN PATENT DOCUMENTS

| CN | 2596193 Y | 12/2003 |
|---|---|---|
| CN | 101334135 A | 12/2008 |

(Continued)

OTHER PUBLICATIONS

May 19, 2016—(CN)—Third Office Action Appn 201410332023.2 with English Tran.

(Continued)

*Primary Examiner* — Anh T Mai
*Assistant Examiner* — Arman B Fallahkhair
(74) *Attorney, Agent, or Firm* — Banner & Witcoff, Ltd.

(57) ABSTRACT

A lamp holder for a desk lamp and the desk lamp are disclosed. The lamp holder comprises: a light scattering plate, comprising a first face and a second face arranged oppositely to each other and side faces around ends of the first and second faces. The light scattering plate comprises at least one light-entering side face where light is capable of entering. Light can enter the light scattering plate from the light-entering side face of the light scattering plate, and after being scattered by the light scattering plate, a portion of the light exits from the first face of the light scattering plate and another portion of the light exits from the second face of the light scattering plate. The lamp holder provides not only (Continued)

sufficient lighting in the operational area located below the lamp holder, but also some lighting above the lamp holder.

13 Claims, 2 Drawing Sheets

(52) U.S. Cl.
CPC .......... *G02B 6/0036* (2013.01); *G02B 6/0058* (2013.01); *G02B 6/0068* (2013.01)

(56) References Cited

U.S. PATENT DOCUMENTS

| | | | | |
|---|---|---|---|---|
| 8,033,706 | B1* | 10/2011 | Kelly | G02B 6/0036 362/307 |
| 8,057,056 | B2* | 11/2011 | Zhu | G02B 6/0018 362/327 |
| 8,092,065 | B2* | 1/2012 | Yeh | G02B 6/0068 362/603 |
| 8,721,152 | B2* | 5/2014 | Coleman | F21S 8/04 362/249.02 |
| 8,896,786 | B2* | 11/2014 | Seo | G02B 6/0036 349/65 |
| 9,028,127 | B2* | 5/2015 | Kim | G02B 6/0026 362/616 |
| 9,063,257 | B2* | 6/2015 | Lavizzari | G02B 6/0021 |
| 9,292,136 | B2* | 3/2016 | Pratt | G06F 3/0425 |
| 9,651,740 | B2* | 5/2017 | Tarsa | G02B 6/34 |
| 2011/0080743 | A1 | 4/2011 | Cheng | |
| 2012/0020108 | A1* | 1/2012 | Chang | G02B 6/0011 362/555 |
| 2014/0098563 | A1* | 4/2014 | Kim | G02B 6/0076 362/606 |
| 2014/0268875 | A1* | 9/2014 | Durkee | G02B 6/0046 362/612 |

FOREIGN PATENT DOCUMENTS

| | | | |
|---|---|---|---|
| CN | 201531828 U | | 7/2010 |
| CN | 201636632 U | * | 11/2010 |
| CN | 202012795 U | | 10/2011 |
| CN | 202419317 U | | 9/2012 |
| JP | 2002133930 A | | 5/2002 |

OTHER PUBLICATIONS

Apr. 20, 2015—International Search Report and the Written Opinion Appn PCT/CN2014/088390 with English Tran.

Nov. 25, 2015—(CN)—First Office Action Appn 201410332023.2 with English Tran.

\* cited by examiner

LAMP HOLDER FOR DESK LAMP AND DESK LAMP

The application is a U.S. National Phase Entry of International Application No. PCT/CN2014/088390 filed on Oct. 11, 2014, designating the United States of America and claiming priority to Chinese Patent Application No. 201410332023.2 filed on Jul. 11, 2014. The present application claims priority to and the benefit of the above-identified applications and the above-identified applications are incorporated by reference herein in their entirety.

TECHNICAL FIELD

Embodiments of the present invention relate to a lamp holder for a desk lamp and a desk lamp.

BACKGROUND

Desk lamps are lighting apparatuses commonly used in people's life. A desk lamp typically comprises a lamp bracket, and comprises a base and a lamp holder which are connected through the lamp bracket. The lamp holder is provided with a light source which is enabled to realize lighting when a power supply is turned on.

SUMMARY

A least one embodiment of the invention provides a lamp holder for a desk lamp and a desk lamp to realize not only sufficient lighting in an operational area located below the lamp holder, but also some lighting above the lamp holder.

A least one embodiment of the invention provides a lamp holder for a desk lamp, which comprises: a light scattering plate, comprising a first face and a second face arranged oppositely to each other and side faces around ends of the first and second faces, light is capable of entering at least one side face of the light scattering plate and the side face of the light scattering plate where light is capable of entering is an light-entering side face; light is capable of entering the light scattering plate from the light-entering side face of the light scattering plate, and after being scattered by the light scattering plate, a portion of the light exits from the first face of the light scattering plate and another portion of the light exits from the second face of the light scattering plate.

A least on embodiment of the invention provides a lamp comprising the above mentioned lamp holder.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE SIGNS LIST OF MAIN ELEMENTS

Figure 1:
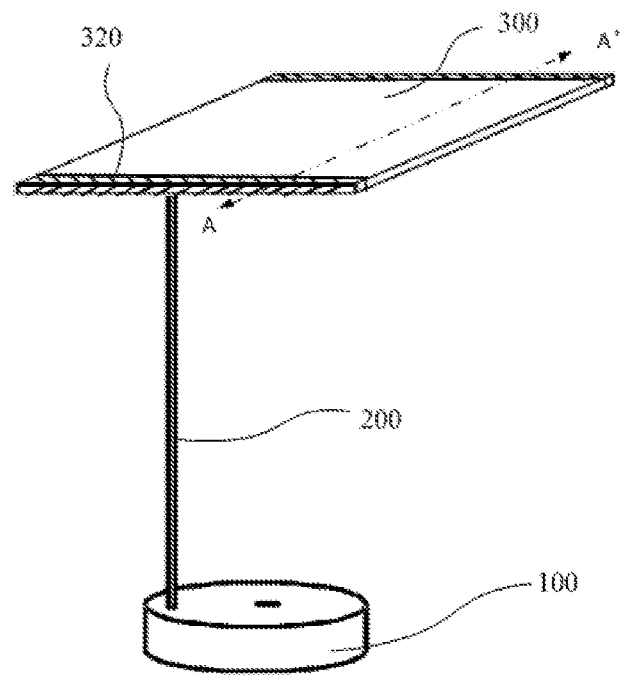
FIG. 1 is a schematic diagram of a desk lamp according to an embodiment of the invention.

100: base; 200: lamp bracket; 300: lamp holder; 310: light guide plate; 311: first face; 312: second face; 313: scattering dots of the first face; 314: scattering dots of the second face; 320: LED light bar

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

It is noted by the inventors of the application that current desk lamps provide only light projected directly down, which makes the operational area too bright but the ambient environment too dark, so that eyes may easily feel fatigue and discomfort in reading and writing in an environment with large brightness contrast.

At least one embodiment of the invention provides a lamp holder for a desk lamp, the lamp holder comprises a light scattering plate which comprises a first face and a second face arranged oppositely and side faces around ends of the first and second faces. Light rays can enter at least one side face of the light scattering plate, and the side face of the light scattering plate where the light rays can enter is a light-entering side face. The light can enter the light scattering plate from the light-entering side face thereof, and with the scattering effect of the light scattering plate, a portion of the light exits from the first face of the light scattering plate and another portion of the light exits from the second face of the light scattering plate.

According to at least one embodiment, the above mentioned lamp holder for the desk lamp can comprise at least one light source. The light source is arranged facing the light-entering side face. Light emitted from the light source can enter the light scattering plate from the light-entering side face thereof.

According to an embodiment, the light scattering plate can comprise two light-entering side faces arranged oppositely to each other, i.e., the light can enter the two side faces, which are arranged oppositely to each other, of the light scattering plate. Of course, the present invention is not limited to this kind of configuration. For example, the light scattering plate can further comprise one or at least three light-entering side faces.

At least one embodiment further provides a desk lamp, which comprises any of above mentioned lamp holders. According to the at least one embodiment of the invention, the desk lamp further comprises a base and a lamp bracket, and the base and the lamp holder are connected by the lamp bracket.

The desk lamp and the lamp holder will be detailed below with the example in which the light scattering plate is a light guide plate and comprises two light-entering side faces arranged oppositely and the light source is an LED bar, in conjunction with accompanying drawings.

Figure 2:
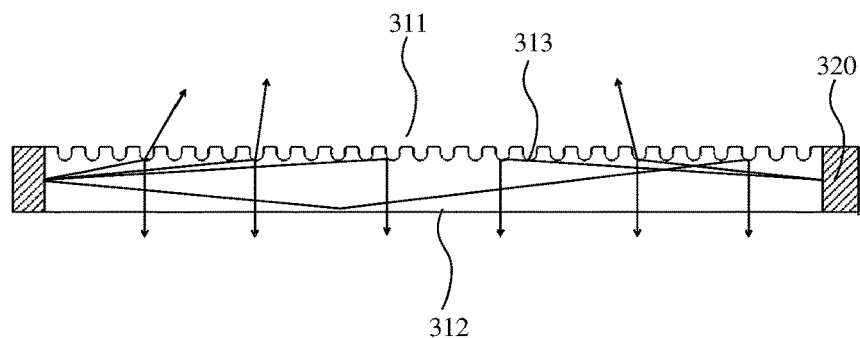
FIG. 2 is a schematic diagram of a section view of a light guide plate of the desk lamp shown in FIG. 1.

As shown in FIGS. 1 and 2, a first embodiment of the invention provides a desk lamp, which comprises a base 100, a lamp bracket 200, and a lamp holder 300; the base 100 and the lamp holder 300 are connected by the lamp bracket 200. The lamp holder 300 comprises a rectangular light guide plate 310 and two light bars 320. The rectangular light plate 310 comprises a first face 311 and a second face 312, which are arranged oppositely to each other, and four side faces around ends of the first and second faces; the first face 311 of the light guide plate is provided with scattering dots 313 in a concave circle dot shape and arranged in a net-like configuration. The two LED light bars 320 are disposed at the two side faces arranged oppositely of the rectangular light guide plate 310 respectively. The side faces of the rectangular light guide plate are arranged facing LED light bars 320, and are the light-entering side faces. Light emitted from the LED light bars 320 can enter the light scattering plate from the light-entering side faces thereof. With the scattering effect of the scattering dots 313 of the first face of the light guide plate, a portion of the light exiting from the first face 311 of the light guide plate and another portion of the light exiting from the second face 312 of the light guide plate.

In the desk lamp according to this embodiment, after the light emitted from the LED light bars enters the light guide plate from the light-entering side face thereof, because of the light guide function of the scattering dots of the first face, a large portion of the light emitting to the first face exits from the second face due to the reflection of the first face and the refraction of the second face, to illuminate the operational area located below the lamp holder, and a small portion of the light emitting to the first face exits from the first face directly due to the refraction of the first face, to illuminate the area located above the lamp holder. The light emitting to the second face undergoes total reflection and is reflected to the first face, and the light guide function of the scattering dots of the first face is the same as the function previously mentioned, so the redundant description will be omitted here. The desk lamp of this embodiment provides not only sufficient lighting in the operational area located below the lamp holder, but also lighting above the lamp holder to some extent, which provides a user with a larger and uniform lighting space, so that visual fatigue can be alleviated.

It should be noted that the light guide plate can be in various shapes. A rectangular shape is just one of these kinds of shapes for illustration only. The shape of the light guide plate can be designed to be circle, square or hexagon or the like as needed.

It should be noted that the shape of the scattering dots can be various shapes. According to at least one embodiment, the shape of the scattering dots can be concave or convex. The above mentioned scattering dots with concave circle dot shape are just shown as an example, for only illustrating the embodiments of the invention. For example, the shape of scattering dotted dots can be broken line type with concave or convex among other shapes.

It should be noted that the light guide plate is just a specific example of the light scattering plate for only illustration. Any other plate shape component can be used as long as is can uniformly scatter light incident from side faces and upper and lower surfaces thereof can transmit light. For example, the light scattering plate further can be an optoelectronic device made from liquid crystal or a polymer composite material, for example, comprising but not limited to a normal mode polymer dispersed liquid crystal device, a reverse mode polymer dispersed liquid crystal device, a polymer network liquid crystal (PNLC) device, a polymer stabilized cholesteric texture liquid crystal device or the like.

It should be noted that the number of LED light bar(s) of the above mentioned embodiment is only for illustration. According to actually need and considering the shape of the light guide plate, the number of the LED light bar(s) can be one, two, three or more. Furthermore, the LED light bars used as the light source is only for illustration, and other light sources such as a cold cathode light source can be elected.

A light guide plate of the desk lamp according to a second embodiment of the invention is different from the light guide plate of the desk lamp according to the first embodiment of the invention, and the rest portions of the desk lamp according to the second embodiment of the invention are the same as those of the desk lamp according to the first embodiment of the invention. According to the light guide plate of the desk lamp of the second embodiment of the invention, as shown in FIG. 3, the second face 312 is provided with scattering dots 314 and the density of the scattering dots 314 of the second face of said light guide plate is less that that of the scattering dots 313 of the first face of the light guide plate.

According to at least one embodiment, the scattering dots of the second face of the light guide plate can be in concave or convex structures. The details can be referred to the above related description, so redundant portions will be omitted here.

The scattering dots of the second face of the light guide plate can allow more light to be emitted from the first face of the light guide plate, to enhance the brightness of the area above the lamp holder. When the first face and the second face are both provided with the scattering dots, the density of the scattering dots of the second face of the light guide plate is less than that of the first face of the light guide plate, which can ensure sufficient lighting in the operational area below the lamp holder while reduce power consumption.

Figure 3:
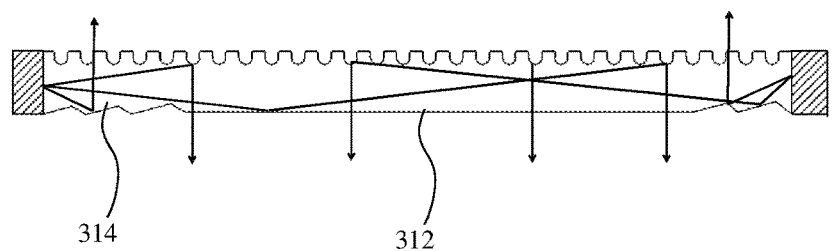
FIG. 3 is a schematic diagram of a section view of a light guide plate of the desk lamp along the section line AA' illustrated in FIG. 1.

As an optional manner, the scattering dots 314 of the second face of the light guide plate can be provided in an edge area of the second face of the light guide, as shown in FIG. 3. As such, more light exits from a middle area of the second face of the light guide plate, i.e., sufficient lighting in the optional area below the lamp holder can be ensured; meanwhile, the scattering dots 314 disposed in the edge area of the second face are close to the LED light bars, which can increase utilization of the light.

On the basis of the desk lamp according to the second embodiment, a desk lamp provided according to a third embodiment of the invention further defines the light guide plate: the density of the scattering dots disposed in the edge area of the first face of the light guide plate is less than that of the scattering dots disposed in the middle area of the first face of the light guide plate.

Figure 4:
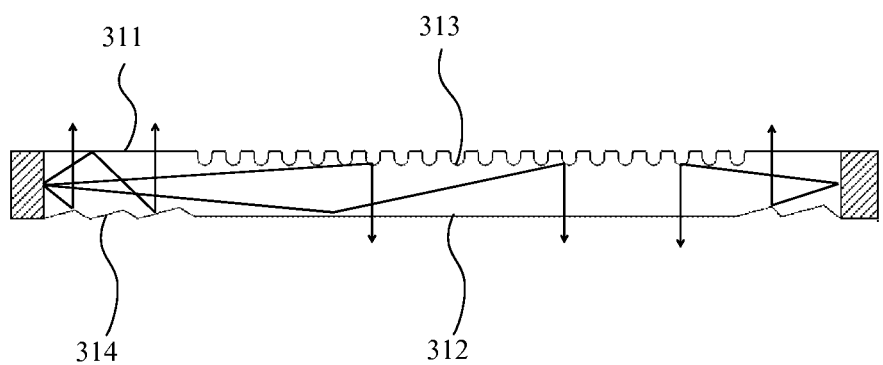
FIG. 4 is a schematic diagram of the section view of a light guide plate of the desk lamp according to a further another embodiment of the invention.

As an alternative manner, the scattering dots 313 of the first face 311 of the light guide plate are disposed in the middle area of the first face, and scattering dots are not disposed in edge areas of the first face 311 of the light guide plate, as shown in FIG. 4. As such, it can make more light to exit from the first face 311 of the light guide plate, to enhance brightness in the area above the head holder.

The implementation of a lamp holder for a desk lamp provided according to at least one embodiment of the invention may be referred to the implementations of the desk lamp according to above mentioned embodiments, so repeated portions will be omitted here.

According to the lamp holder for the desk lamp and the desk lamp of embodiments of the invention, after light enters the light scattering plate from the light-entering side face thereof, because of the function of scattering for the light, a portion of the light exits from the second face to illuminate the operational area located below the lamp holder, and another portion of the light exits from the first face to illuminate the area located above the lamp holder. The lamp holder for the desk lamp and the desk lamp provided according to embodiments of the invention can provide not only sufficient lighting in the operational area located below the lamp holder, but also some lighting above the lamp holder, which provides a user with a larger and uniform lighting space, so that visual fatigue can be alleviated.

It is obvious for those skilled in the related technical field that any change or variation can be made to the embodiments without a departure from the spirit and scope of the invention. As such, these changes or variations are intended to be comprised within the invention, insofar as they are within the scope of the appended claims or the equivalents thereof.

This application claims the priority of Chinese Patent Application No. 201410332023.2 filed on Jul. 11, 2014, which is hereby incorporated entirely herein by reference.

The invention claimed is:

1. A lamp holder for a desk lamp, comprising: a light scattering plate, wherein
   the light scattering plate comprises a first face and a second face arranged oppositely, and side faces around ends of the first and second faces, light is capable of entering at least one side face of the light scattering plate, wherein the at least one side face of the light scattering plate is a light-entering side face;
   the light scattering plate comprises two light-entering side faces arranged oppositely to each other;
   the first face comprises first concave portions, so as to provide first scattering dots;
   light, after entering the light scattering plate from the light-entering side face is scattered by the first scattering dots, and a portion of the light exits from the first face and another portion of the light exits from the second face;
   the second face comprises second concave portions, so as to provide second scattering dots;
   a density of the second scattering dots along a direction in which the two light-entering side faces are arranged oppositely to each other is less than a density of the first scattering dots along the direction;
   the second face comprises a middle region and edge regions provided between and immediately adjacent to the middle region and the two light-entering side faces;
   the second scattering dots are only located in the edge regions; and
   some of the light is scattered and reflected via the second scattering dots and exits from the first face, and a majority of the light is reflected by the first scattering dots and directed by the first scattering dots and the second scattering dots and exits from the second face.

2. The lamp holder for the desk lamp of claim 1, further comprising: at least one light source, wherein
   the light source is arranged facing the light-entering side face; and
   light emitted from the light source is capable of entering the light scattering plate from the light-entering side face.

3. The lamp holder for the desk lamp of claim 2, wherein the light source is an LED light bar or a cold cathode light source.

4. A desk lamp comprising a lamp holder of claim 1.

5. The desk lamp of claim 4, further comprising a base and a lamp bracket, wherein the base and the lamp holder are connected by the lamp bracket.

6. The lamp holder for the desk lamp of claim 1, wherein a density of the first scattering dots of an edge area of the first face is less than that of the first scattering dots of a middle area of the first face.

7. The lamp holder for the desk lamp of claim 1, wherein the first scattering dots are uniformly disposed in a middle area of the first face.

8. The lamp holder for the desk lamp of claim 1, wherein the first scattering dots are in a structure of a concave or convex shape.

9. The lamp holder for the desk lamp of claim 1, wherein the second scattering dots are in a structure of a concave or convex shape.

10. The lamp holder for the desk lamp of claim 1, wherein the light scattering plate is a light guide plate.

11. The lamp holder for the desk lamp of claim 1, wherein the light scattering plate is a normal mode polymer dispersed liquid crystal device, a reverse mode polymer dispersed liquid crystal devices, a polymer network liquid crystal device, or a polymer stabilized cholesteric texture liquid crystal device.

12. A lamp holder for a desk lamp, comprising: a light scattering plate, wherein
   the light scattering plate comprises a first face and a second face arranged oppositely in a first direction, and side faces around ends of the first and second faces, light is capable of entering at least one side face, wherein the at least one side face is a light-entering side face;
   the first face comprises first concave portions, so as to provide first scattering dots, cross-sections of which are concave semi-circles; the second face comprises second concave portions, so as to provide second scattering dots;
   the first concave portions and the first face are integral, and the second concave portions and the second face are integral;
   a density of the second scattering dots along the first direction is less than a density of the first scattering dots along the first direction, so as to allow an intensity of the light exiting from the second face to be larger than intensity of the light exiting from the first face;
   in a direction perpendicular to the light scattering plate, the second scattering dots are not overlapped with the first scattering dots; and
   some of the light, after entering the light scattering plate from the light-entering side face, is scattered and reflected via the second scattering dots and exits from the first face of the light scattering plate, and a majority of the light is reflected by the first scattering dots and directed by the first scattering dots and the second scattering dots and exits from the second face of the light scattering plate.

13. A lamp holder for a desk lamp, comprising: a light scattering plate, wherein
   the light scattering plate comprises a first face and a second face arranged oppositely in a first direction, and side faces around ends of the first and second faces, light is capable of entering at least one side face, wherein the at least one side face is a light-entering side face;
   the first face comprises first concave portions, so as to provide first scattering dots, cross-sections of which are concave semi-circles;
   the second face comprises second concave portions, so as to provide second scattering dots;

the first concave portions and the first face are integral, and the second concave portions and the second face are integral;

a size of the first scattering dots in the first direction is smaller than a size of the second scattering dots in the first direction, so as to allow a density of the second scattering dots along the first direction to be less than a density of the first scattering dots along the first direction, and an intensity of light exiting from the second face is larger than an intensity of light exiting from the first face;

in a direction perpendicular to the light scattering plate, the second scattering dots are not overlapped with the first scattering dots; and some of the light, after entering the light scattering plate from the light-entering side face, is scattered and reflected via the second scattering dots and exits from the first face, and a majority of the light is reflected by the first scattering dots and directed by the first scattering dots and the second scattering dots and exits from the second face.

\* \* \* \* \*